(12) United States Patent
Furman et al.

(10) Patent No.: US 9,574,965 B2
(45) Date of Patent: Feb. 21, 2017

(54) SYSTEM AND METHOD OF DETERMINING BEARING HEALTH IN A ROTATING MACHINE

(71) Applicant: General Electric Company, Schenectady, NY (US)

(72) Inventors: Anthony Furman, Scotia, NY (US); Aninda Bhattacharya, Bangalore (IN); Matthew John Malone, Lawrence Park, PA (US); Mahesh Raveendranatha Panicker, Bangalore (IN)

(73) Assignee: General Electric Company, Niskayuna, NY (US)

( * ) Notice: Subject to any disclaimer, the term of this patent is extended or adjusted under 35 U.S.C. 154(b) by 214 days.

(21) Appl. No.: 14/313,734

(22) Filed: Jun. 24, 2014

(65) Prior Publication Data

US 2015/0369687 A1    Dec. 24, 2015

(51) Int. Cl.
*G01M 1/28* (2006.01)
*G01B 21/26* (2006.01)
(Continued)

(52) U.S. Cl.
CPC .............. *G01M 1/28* (2013.01); *G01B 21/16* (2013.01); *G01M 1/16* (2013.01)

(58) Field of Classification Search
CPC ................................. G01B 21/16; G01M 1/28
(Continued)

(56) References Cited

U.S. PATENT DOCUMENTS 3,593,127 A * 7/1971 Lucka ................. G01B 7/023
 324/662
4,334,427 A 6/1982 Armstrong
(Continued)

FOREIGN PATENT DOCUMENTS

DE 10134543 2/2003
DE 202009006490 7/2009
(Continued)

OTHER PUBLICATIONS

Andrea Stefani, Induction Motor Diagnosis in Variable Speed Drives, Mar. 2010, Ph. D. thesis, Department of Electrical Engineering, University of Bologna, 132 pp.
(Continued)

*Primary Examiner* — Natalie Huls
(74) *Attorney, Agent, or Firm* — Joseph J. Christian

(57) ABSTRACT

A monitoring system and method monitor changes in clearance distances between a sensor and a rotating component of a machine. Imbalance and/or wear in the machine is identified based on the changes in the clearance distances. The system and method optionally both measure the clearance distances and a rotating speed of the rotating component of the machine with the same sensor. In order to identify imbalance in the machine, a spectral energy of the machine can be calculated based on the changes in the clearance distances, and the imbalance in the machine can be identified based on the spectral energy. The system and method can determine a trigger speed of the machine that is associated with the wear in the machine based on the changes in the clearance distance. A remaining useful life of the machine can be estimated based on changes in the trigger speed.

10 Claims, 9 Drawing Sheets

(51) Int. Cl.
*G01B 21/16* (2006.01)
*G01M 1/16* (2006.01)

(58) Field of Classification Search
USPC .................................. 73/457, 655, 657, 660
See application file for complete search history.

(56) References Cited

U.S. PATENT DOCUMENTS

| | | | | |
|---|---|---|---|---|
| 4,413,519 | A * | 11/1983 | Bannister | G01S 13/88 |
| | | | | 342/118 |
| 4,423,635 | A * | 1/1984 | Senicourt | G01M 1/22 |
| | | | | 324/207.16 |
| 4,490,622 | A | 12/1984 | Osborn | |
| 4,847,556 | A * | 7/1989 | Langley | G01P 3/488 |
| | | | | 324/207.15 |
| 4,887,468 | A * | 12/1989 | McKendree | G01H 1/006 |
| | | | | 73/660 |
| 4,896,537 | A * | 1/1990 | Osborne | G01H 1/006 |
| | | | | 324/207.22 |
| 4,953,110 | A | 8/1990 | Chartrand | |
| 4,967,153 | A * | 10/1990 | Langley | G01P 3/488 |
| | | | | 324/174 |
| 5,097,711 | A * | 3/1992 | Rozelle | G01H 1/006 |
| | | | | 73/660 |
| 5,216,915 | A | 6/1993 | Sakamoto | |
| 5,385,129 | A | 1/1995 | Eyberg | |
| 5,479,826 | A * | 1/1996 | Twerdochlib | G01H 9/00 |
| | | | | 324/642 |
| 5,511,426 | A * | 4/1996 | Clement | G01B 11/16 |
| | | | | 73/655 |
| 5,711,272 | A | 1/1998 | Maegawa et al. | |
| 5,726,905 | A | 3/1998 | Yazici et al. | |
| 5,728,941 | A | 3/1998 | Yamamoto et al. | |
| 5,816,358 | A | 10/1998 | Adler et al. | |
| 5,860,800 | A | 1/1999 | Kramer et al. | |
| 5,968,371 | A | 10/1999 | Verdegan et al. | |
| 6,023,651 | A | 2/2000 | Nakayama et al. | |
| 6,035,265 | A | 3/2000 | Dister et al. | |
| 6,209,672 | B1 | 4/2001 | Severinsky | |
| 6,368,077 | B1 | 4/2002 | Meyerkord et al. | |
| 6,496,782 | B1 | 12/2002 | Claus et al. | |
| 6,510,731 | B2 | 1/2003 | Schricker et al. | |
| 6,530,754 | B2 | 3/2003 | Vogel | |
| 6,658,346 | B2 | 12/2003 | Maegawa | |
| 6,727,725 | B2 | 4/2004 | Devaney et al. | |
| 6,745,568 | B1 | 6/2004 | Squires | |
| 6,966,746 | B2 | 11/2005 | Cardenas et al. | |
| 6,968,268 | B2 | 11/2005 | Yamada et al. | |
| 7,133,766 | B2 | 11/2006 | Kokubo | |
| 7,184,930 | B2 | 2/2007 | Miyasaka et al. | |
| 7,197,916 | B2 | 4/2007 | Matsumoto et al. | |
| 7,631,498 | B2 | 12/2009 | Greentree | |
| 7,761,223 | B2 | 7/2010 | Wang et al. | |
| 8,146,358 | B2 | 4/2012 | Greentree | |
| 8,344,741 | B2 * | 1/2013 | Sheikman | G01B 7/14 |
| | | | | 324/658 |
| 8,393,852 | B2 | 3/2013 | Kaufmann et al. | |
| 8,505,369 | B2 | 8/2013 | Ueberschar et al. | |
| 2002/0050271 | A1 | 5/2002 | Hasegawa et al. | |
| 2004/0048131 | A1 | 3/2004 | Canepa et al. | |
| 2004/0148926 | A1 | 8/2004 | Morinaga et al. | |
| 2004/0231897 | A1 | 11/2004 | Kimura et al. | |
| 2005/0204805 | A1 | 9/2005 | Wakahara et al. | |
| 2005/0218887 | A1 * | 10/2005 | Twerdochlib | F01D 21/003 |
| | | | | 324/207.16 |
| 2007/0079613 | A1 | 4/2007 | Greentree | |
| 2008/0149049 | A1 * | 6/2008 | Mollmann | F01D 21/003 |
| | | | | 123/2 |
| 2009/0084187 | A1 * | 4/2009 | Twerdochlib | G01H 1/06 |
| | | | | 73/660 |
| 2009/0090182 | A1 * | 4/2009 | Holmquist | G01M 15/14 |
| | | | | 73/455 |
| 2009/0120174 | A1 | 5/2009 | Nadera et al. | |
| 2009/0229355 | A1 | 9/2009 | Shoda | |
| 2009/0290971 | A1 | 11/2009 | Shamseldin et al. | |
| 2009/0314092 | A1 * | 12/2009 | Twerdochlib | G01H 1/006 |
| | | | | 73/659 |
| 2010/0063660 | A1 | 3/2010 | Uchida | |
| 2010/0089166 | A1 * | 4/2010 | Zielinski | G01H 1/006 |
| | | | | 73/660 |
| 2010/0132435 | A1 | 6/2010 | Doring | |
| 2010/0162797 | A1 | 7/2010 | Summers et al. | |
| 2010/0169030 | A1 | 7/2010 | Parlos | |
| 2010/0211296 | A1 | 8/2010 | Saunders | |
| 2010/0292937 | A1 | 11/2010 | Hosny et al. | |
| 2011/0295538 | A1 * | 12/2011 | Andarawis | F01D 11/14 |
| | | | | 702/94 |
| 2013/0060417 | A1 | 3/2013 | Oriet et al. | |
| 2013/0067914 | A1 | 3/2013 | Malone et al. | |
| 2013/0067915 | A1 | 3/2013 | Flynn et al. | |
| 2013/0181699 | A1 * | 7/2013 | Wickstead | G01B 21/16 |
| | | | | 324/207.16 |
| 2015/0092039 | A1 * | 4/2015 | Ruhge | G01B 21/16 |
| | | | | 348/82 |

FOREIGN PATENT DOCUMENTS

| | | |
|---|---|---|
| EP | 0522849 | 7/1991 |
| EP | 1304463 | 4/2003 |
| EP | 1561916 | 8/2005 |
| FR | 2925591 | 6/2009 |
| FR | 2930037 | 10/2009 |
| JP | 59113236 | 6/1984 |
| WO | WO2009145745 | 12/2009 |
| WO | 2011131826 A1 | 10/2011 |

OTHER PUBLICATIONS

Blodt et al., Mechanical Fault Detection in Induction Motor Drives Through Stator Current Monitoring—Theory and Application Examples, May 21, 2010, 33 pp.

Mounir Djeddi, Pierre Granjon, and Benoit Leprettre, *Bearing Fault Diagnosis in Induction Machine Based on Current Analysis Using High-Resolution Technique*, IEEE. 2007.

Pratesh Jayaswal, A.K. Wadhwani, and K.B. Mulchandani. *Machine Fault Signature Analysis*, International Journal of Rotating Machinery vol. 2008 (2008). Article ID 583982, 10 pgs., Hindawi Publishing Corporation.

Royo, J., Segui, R., Pardina, A., Nevot, S., Arcega, F.J., *Machine current signature analysis as a way for fault detection in permanent magnet motors in elevators*, IEEE, Sep. 6-9, 2008, pp. 1-6.

ISR and W/O for PCT/US2012/044224 dated Dec. 4, 2012.

ISR and W/O for PCT/US2012/053506 dated Feb. 11, 2013.

U.S. Appl. No. 13/047,200, filed Mar. 14, 2011.

ISR and WO for PCT/US2012/057423 dated Feb. 18, 2013.

Pfau et al., Virtual Four Sensor Fast Response Aerodynamic Probe "FRAP"), The 16th Symposium of Measuring Techniques in Transonic and Supersonic Flow in Cascades and Turbomachines, pp. 1-8, Cambridge, UK, Sep. 2002.

Schlienger et al., "Measuring Unsteady 3D Flow With a Single Pressure Transducer", pp. 1-10, Laboratory for Turbomachinery, ETH Zurich, Switzerland, undated.

Pfau et al., "Unsteady Flow Interactions Within the Inlet Cavity of a Turbine Rotor Tip Labyrinth Seal", Journal of Turbomachinery, vol. 127, pp. 679-688, Oct. 2005.

Schuck, et al., "Influence of Structural Parameters and Flow Conditions on the Dynamic Behaviour of Flexible Labyrinth Seals", Darmstadt University of Technology, Dpt. Of Mechatronics and Machine Acoustics, Darmstadt, Germany, p. 1, undated.

Eldin, "Leakage and Rotordynamic Effects of Pocket Damper Seals and See-Through Labyrinth Seals", Dissertation submitted to Texas A&M University, pp. I-xvi, and pp. 1-205, Dec. 2007.

Malone, U.S. Appl. No. 13/102,700, entitled "Apparatus System and Method for Testing a Turbocharger", pp. 1-24, filed May 6, 2011.

Gao R.X. et al., Neural Networks, 2006. IJCNN '06. International Joint Conference on, IEEE, "A Neural Network Approach to Bearing Health Assessment", 2006; pp. 899-906.

(56) References Cited

OTHER PUBLICATIONS

Zhang, et al., Journal of Physics: Conference Series, IOP Science, "Modelling of Outer and Inner Film Oil Pressure for Floating Ring Bearing Clearance in Turbochargers", 2011; vol. 305; Issue 1.

* cited by examiner

SYSTEM AND METHOD OF DETERMINING BEARING HEALTH IN A ROTATING MACHINE

FIELD

Embodiments of the subject matter described herein relate to monitoring health of machines, such as monitoring wear and/or remaining useful lives of machines that including moving (e.g., rotating) components.

BACKGROUND

Machines having rotating components can wear down over time due to prolonged use, even if the machines are maintained and/or periodically repaired. Some machines are not monitored for wear during use, but only are examined for wear between periods of use. For example, turbochargers in some vehicles, such as locomotives, may not have instrumentation to monitor vibration, temperatures of bearings, or rotor response during operation of the turbocharger. Excessive wear of bearings can lead to rotor instability, high displacement and eventual rubs, which can result in failure of the turbocharger. High imbalance caused by foreign object damage (FOD) or excessive deposition on the turbine blades can also lead to high shaft motion, bearing wear and eventual failure due to rotating contact with stationary parts.

Some machines include external accelerometers and/or use direct measurement of bearing temperatures to monitor bearing health. But, these devices add to the cost and complexity of the machines. Other machines can be inspected at specified megawatt intervals, but this can involve the tear down of the machine, which reduces the time that the machine can be used.

BRIEF DESCRIPTION

In one embodiment, a method (e.g., for monitoring a machine) includes monitoring changes in clearance distances between a sensor and a rotating component of a machine, and identifying one or more of imbalance or wear in the machine based on the changes in the clearance distances.

The method optionally can include measuring the clearance distances with the sensor and measuring a rotating speed of the rotating component of the machine with the sensor. In order to identify imbalance in the machine, a spectral energy of the machine can be calculated based on the changes in the clearance distances, and the imbalance in the machine can be identified based on the spectral energy.

In another aspect, the method optionally can include determining a trigger speed of the machine that is associated with the wear in the machine. The trigger speed can be determined based on the changes in the clearance distance. A remaining useful life of the machine can be estimated based on changes in the trigger speed.

In another embodiment, a system (e.g., for monitoring a machine) includes an analysis device configured to monitor changes in clearance distances between a sensor and a rotating component of a machine. The analysis device also can be configured to identify one or more of imbalance or wear in the machine based on the changes in the clearance distances.

The system optionally can include an acquisition device configured to obtain the clearance distances with a sensor that also measures a rotating speed of the rotating component of the machine.

The analysis device optionally can be configured to calculate a spectral energy of the machine based on the changes in the clearance distance. The analysis device can be configured to identify the imbalance in the machine based on the spectral energy.

In another aspect, the analysis device can be configured to determine a trigger speed associated with the wear in the machine based on the changes in the clearance distance, where the trigger speed is based on the changes in the clearance distances.

In another embodiment, another method (e.g., for monitoring a machine) includes obtaining clearance distances between a speed sensor and a rotating component of a machine, monitoring changes in the clearance distances, and at least one of: calculating a spectral energy of the machine based on one or more frequency domain signals representative of the changes in the clearance distances, and/or identifying a trigger speed of the machine based on an operating speed of the machine associated with the one or more frequency domain signals in which a waveform of interest is identified. The method also can include identifying one or more of wear of the machine based on the trigger speed of the machine or imbalance in the machine based on the spectral energy.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein relate to systems and methods that examine changes in distances between a sensor and a moving component of a machine. These changes can be measured in a variety of manners, and may be used to identify imbalance and/or wear to one or more parts of the machine. In one example, a speed sensor, such as a Variable Reluctance Sensor (VRS), can be used to measure rotating speeds of turbochargers to obtain this information. Optionally, another type of sensor can be used. The sensor can output a data signal that is representative of a clearance distance between the sensor and the moving component of the machine (e.g., an outer surface of the rotor of the turbocharger). This data can be referred to as a clearance signal, and may represent the amount of clearance (e.g., spatial separation) between the sensor (which may be fixed in position) and the moving component. The clearance signal can be derived from the raw speed signal or in another manner.

The clearance signal may be extracted by one or more demodulation algorithms, and then used to determine the wear of the machine, such as the wear of journal bearings in the turbocharger. While the description herein focuses on the monitoring of a turbocharger, not all embodiments are so limited. One or more embodiments of the inventive subject matter may be used to determine, track, and/or estimate wear or damage to one or more other types of machines.

With respect to a turbocharger, as the wear of the journal bearings increases, the distance between the moving component (e.g., the rotor) and the bearing inner race increases. Increase in this distance reduces dynamic stiffness of the bearing. Both direct and quadrature stiffness of the journal bearing are dependent on the speed and clearance of the rotor. Above a certain speed, the direct and the quadrature stiffness of the bearing may approach or become equal to zero, which can lead to the onset of fluid instability. This speed is referred to herein as a threshold of instability. At speeds above this threshold, the rotor can exhibit subsynchronous behavior, potentially leading to excessive shaft motion and rubs.

As the wear of the bearing increases (e.g., due to turbocharger operation over a long period of time or another cause), the onset of fluid instabilities can begin to occur at lower speeds. A functional map can be developed between the threshold of instability and bearing wear to quantify the amount wear that a bearing can withstand without opening the turbocharger to inspect the bearing. The bearing wear that is estimated can be used to generate a prediction of the Remaining Useful Life (RUL) of the bearing. RUL can be used to decide the time of inspection and replacement of the bearings to prevent breakdown of the turbocharger in the field.

Figure 1:
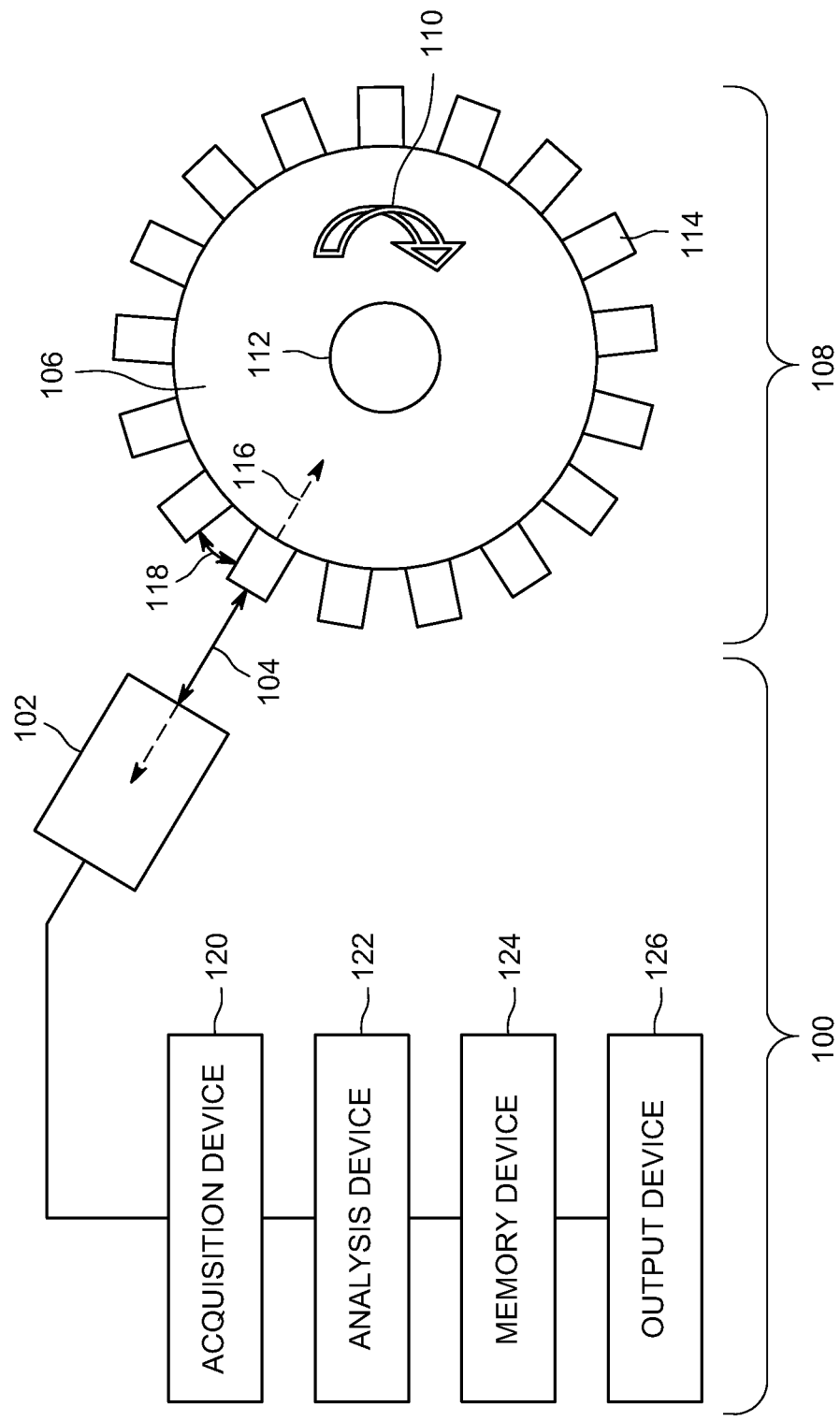
FIG. 1 is a schematic diagram of a machine monitoring system according to one embodiment.

FIG. 1 is a schematic diagram of a machine monitoring system 100 according to one embodiment. The system 100 includes a sensor 102 that measures a clearance distance 104 between the sensor 102 and a moving component 106 of a machine 108. In one example, the moving component 106 may be a toothed wheel or rotor of a turbocharger 108 that rotates about a shaft 112 in a rotating direction 110. The moving component 106 includes several radially protruding teeth 114 along an outer circumference of the moving component 106.

The sensor 102 may measure changes in magnetic flux between the sensor 102 and the moving component 106. For example, the sensor 102 may represent a variable reluctance (VR) sensor that measures a time-varying magnetic flux that is representative of the clearance distances 104. In one aspect, the sensor 102 may be a speed sensor of a vehicle that is used to measure the speed at which the machine 108 is operating. Using the same data that is used to measure the operating speed of the machine 108, the system 100 can monitor and/or estimate wear of one or more parts of the machine 108. Alternatively, the sensor 102 may be another type of sensor, such as an optic sensor, that measures the clearance distances 104.

The clearance distances 104 can change with respect to time. For example, when a tooth 114 is oriented toward the sensor 102 (e.g., along a measurement path 116, as shown in FIG. 1), the clearance distance 104 is smaller than when a tooth 114 is not along the measurement path 116 (e.g., when a gap 118 between the teeth 114 is along the measurement path 116).

The sensor 102 outputs data representative of changes in the clearance distance 104 with respect to time. This data can be output to an acquisition device 120 of the system 100. The acquisition device 120 can include hardware circuits or circuitry that include and/or are connected with one or more computer processors (e.g., microprocessors) for performing various operations described herein. The acquisition device 120 shown in FIG. 1 additionally or alternatively can represent one or more sets of instructions stored on a computer-readable storage medium (e.g., software stored on a computer memory) that direct one or more processors to perform the various operations described herein. The acquisition device 120 can monitor the changes in the clearance distance 104 with respect to time.

Figure 2:
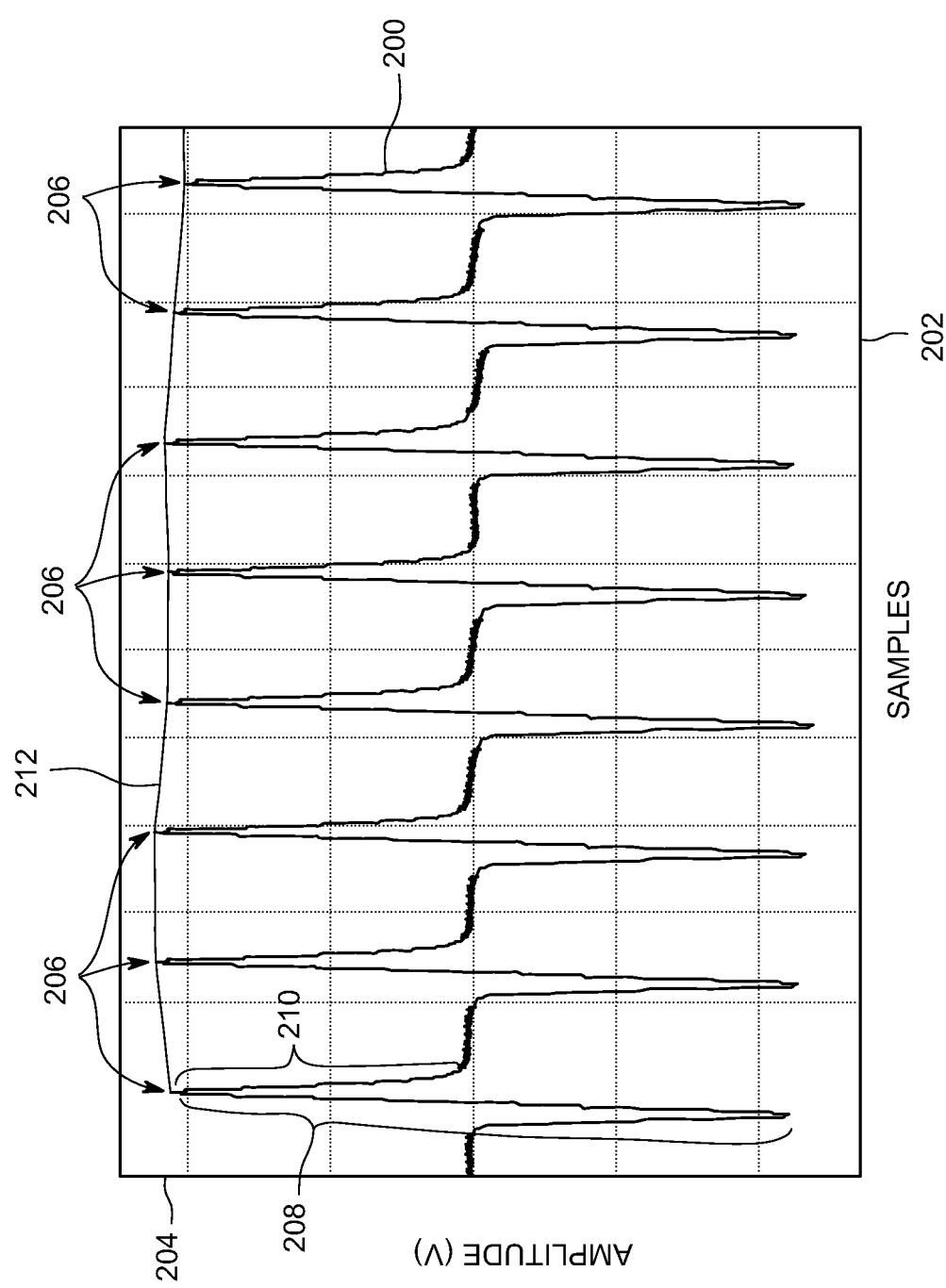
FIG. 2 illustrates a time domain clearance signal that is output by a sensor shown in FIG. 1 according to one example.

FIG. 2 illustrates a clearance signal 200 that is output by the sensor 102 according to one example. The clearance signal 200 is representative of the clearance distances 104 (shown in FIG. 1), and is shown in the time domain alongside a horizontal axis 202 representative of a number of samples or time, and alongside a vertical axis 204 representative of an amplitude of the clearance signal 200. In the illustrated example, the clearance signal 200 is a voltage signal that is representative of the clearance distances 104. Larger magnitudes of the clearance signal 200 indicate smaller clearance distances 104 and smaller magnitudes of the clearance signal 200 indicate increased clearance distances 104. For example, the clearance signal 200 may increase when a tooth 114 (shown in FIG. 1) is between the sensor 102 and the rest of the component 106, and the clearance signal 200 may decrease when no tooth 114 is between the sensor 102 and the rest of the component 106. Alternatively, larger magnitudes of the clearance signal 200 indicate larger clearance distances 104 and smaller magnitudes of the clearance signal 200 indicate reduced clearance distances 104. For example, the clearance signal 200 may decrease when a tooth 114 (shown in FIG. 1) is between the sensor 102 and the rest of the component 106, and the clearance signal 200 may increase when no tooth 114 is between the sensor 102 and the rest of the component 106. Optionally, the clearance signal 200 may be another type of signal.

The clearance signal 200 can be examined by the acquisition device 120 (shown in FIG. 1) to determine how rapidly the moving component 106 (shown in FIG. 1) of the machine 108 (shown in FIG. 1) is moving. For example, the acquisition device 120 can identify peaks 206 in the clearance signal 200 and can determine how frequently these peaks 206 occur. The peaks 206 may be identified by locating a rising edge or portion 208 of the clearance signal 200 and a subsequent falling edge or portion 210 of the clearance signal 200. The rising edge 208 includes a segment of the clearance signal 200 having a positive slope (or that increases in magnitude over a designated time period), while the falling edge 210 includes a segment of the clearance signal 200 that follows the rising edge 208 and that has a negative slope (or that decreases in magnitude over the same or different designated time period). The peaks 206 may occur between the rising and falling edges 208, 210, and be identified based on the transition in the clearance signal 200 from the rising edge 208 to the falling edge 210. Optionally, the peaks 206 can be identified in another manner.

In one embodiment, the peaks 206 represent the largest magnitude of the clearance signal 200 between a rising edge 208 and a subsequent (e.g., the next) falling edge 210. Alternatively, the peaks 206 may represent a larger magnitude, but not necessarily the largest magnitude, of the clearance signal 200 between the rising edge 208 and the subsequent falling edge 210.

The frequency at which the peaks 206 occur can be measured by the acquisition device 120. This measured frequency can indicate the speed at which the wheel 106 is rotating, as increased frequencies of the peaks 206 represent faster rotation speeds of the wheel 106 and reduced frequencies of the peaks 206 represent slower rotation speeds of the wheel 106. The frequencies of the peaks 206 can be used by the acquisition device 120 to calculate the speed at which the moving component 106 is rotating.

But, the identification of the peaks 206 additionally or alternatively may be used to monitor and/or estimate wear of the machine 108 (e.g., of bearings of the machine 108). In one embodiment, an analysis device 122 (shown in FIG. 1) of the system 100 (shown in FIG. 1) extracts a demodulated signal 212 from the peaks 206. Alternatively, the analysis device 122 can extract the demodulated signal 212 from other locations of the clearance signal 200. The demodulated signal 212 represents changes in the clearance signal 200 at or near the peaks 206. For example, in one embodiment, the modulation signal 212 connects the peaks 206 over time. Optionally, the demodulated signal 212 may represent changes in the clearance signal 200 in another manner.

The analysis device 122 can include hardware circuits or circuitry that include and/or are connected with one or more computer processors (e.g., microprocessors) for performing various operations described herein. The analysis device 122 shown in FIG. 1 additionally or alternatively can represent one or more sets of instructions stored on a computer-readable storage medium (e.g., software stored on a computer memory) that direct one or more processors to perform the various operations described herein.

In one embodiment, the analysis device 122 samples the demodulated signal 212 to generate a sampled signal. For example, the analysis device 122 may determine the magnitude of the demodulated signal 212 periodically or otherwise, and these magnitudes may form a sampled signal.

Figure 3:
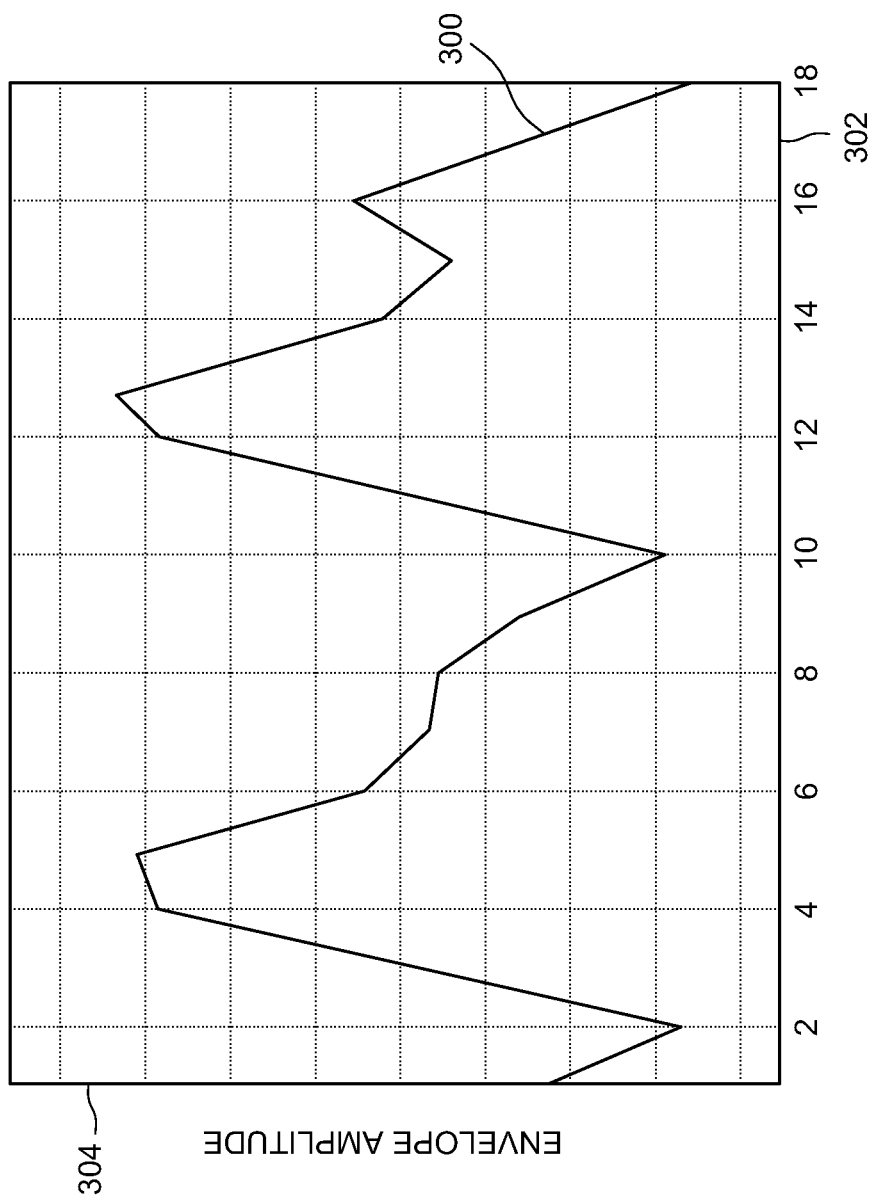
FIG. 3 illustrates a sampled signal that is obtained from a modulation signal shown in FIG. 2.

FIG. 3 illustrates a sampled signal 300 that is obtained from the demodulated signal 212 shown in FIG. 2 according to the example illustrated in FIG. 2. The sampled signal 300 is shown in FIG. 3 alongside a horizontal axis 302 representative of samples of the demodulated signal 212 or time, and alongside a vertical axis 304 representative of magnitude of the sampled signal 300 and/or the demodulated signal 212.

The analysis device 122 can examine the sampled signal 300 in order to identify imbalance in the machine 108. Variations in the sampled signal 300 indicate changes in the clearance distances 104 between the sensor 102 and the moving component 106 of the machine 108. For example, if the clearance distance 104 between the sensor 102 and the moving component 106 of the machine 108 remained constant, then the sampled signal 300 may be flat or substantially flat. Changes in the clearance distance 104, however, result in the sampled signal 300 increasing or decreasing over time. While some of these increases or decreases in the sampled signal 300 may be at least partially caused by the passage of the teeth 114 by the sensor 102, at least part of the increases and/or decreases may be caused by imbalance in the machine 108.

For example, a turbocharger can use fixed geometry fluid film bearings to support the rotor. The design of these bearings can be a compromise between higher clearance to provide tolerance to imbalance in the turbocharger versus reduced clearance to improve high speed stability and thereby eliminate potentially unstable sub-synchronous responses of the turbocharger. Changes in the sampled signal 300 may represent changes in motion of the shaft 112 or other component of the machine 108. For example, higher levels of imbalanced motion of the shaft 112 (e.g., motion other than rotation, such as wobble or side-to-side motion of the shaft 112) can result in larger changes in the sampled signal 300. Higher levels of the imbalanced motion of the shaft 112 can be indicative of changes in the clearance distances between bearings between the shaft 112 and the rotor 106, which can reflect imbalance in the rotor 106. As used herein, "imbalance" can represent imbalanced movements, such as wobble or side-to-side movement of the rotating component that is outside of rotation around the axis of rotation of the rotating component.

In order to determine if there is imbalance in the machine 108 and/or if the imbalance is changing (e.g., getting worse), the analysis device 122 can transform the sampled signal 300 to the frequency domain. For example, the analysis device 122 can perform a fast Fourier transform or other transform to the sampled signal 300 to generate an imbalance signal. Optionally, another technique may be used to transform the sampled signal 300 into the frequency domain.

Figure 4:
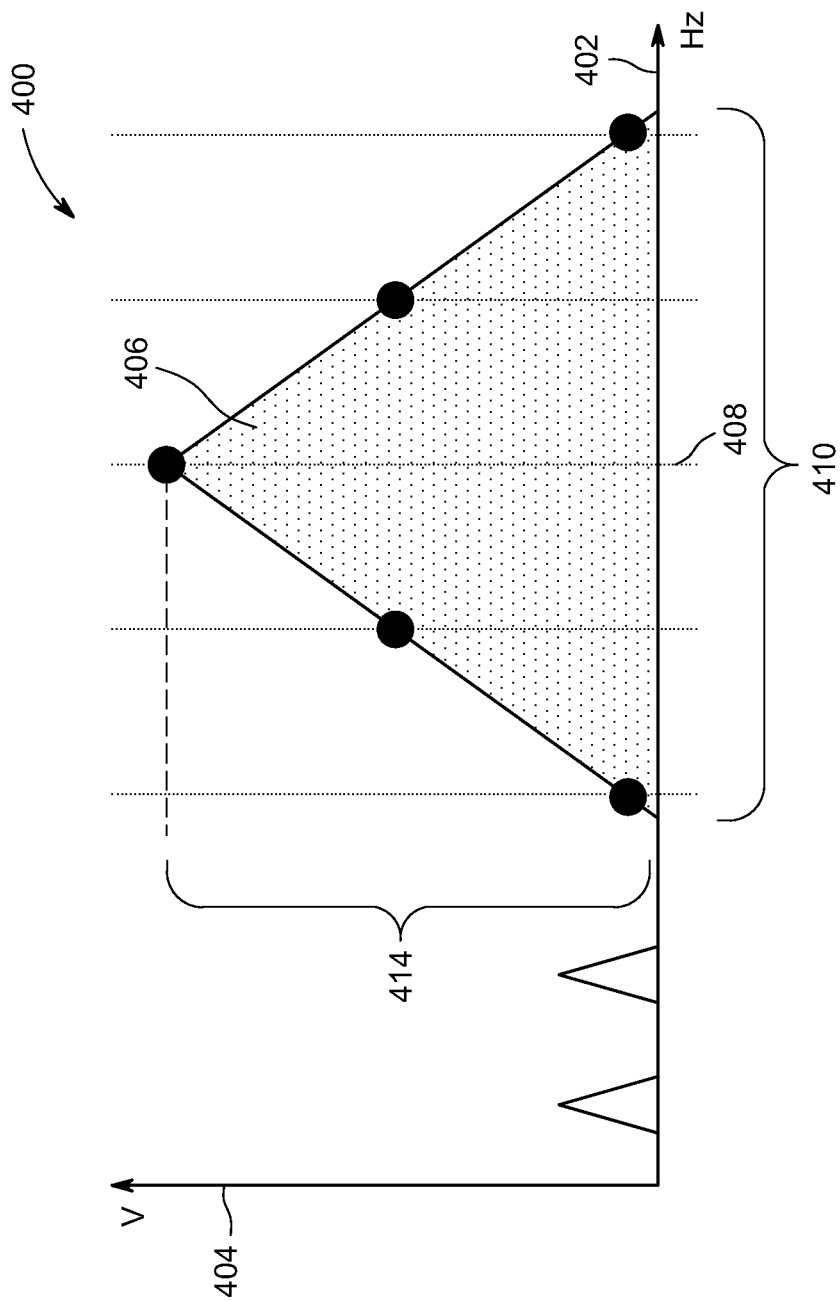
FIG. 4 illustrates spectral energy around a 1× frequency component of the machine shown in FIG. 1 according to one example.

FIG. 4 illustrates the frequency spectrum of a frequency domain clearance signal 400 of the machine 108 according to one example. The clearance signal 400 can be used to quantify the amount of imbalance motion of the shaft 112 and/or other components of the machine 108. The clearance signal 400 is shown alongside a horizontal axis 402 representative of frequency and a vertical axis 404 representative of magnitude or amplitude of the clearance signal 400 (e.g., voltage or another value).

The analysis device 122 can examine one or more portions of the clearance signal 400 in order to calculate spectral energy of the clearance signal generated by the machine 108. In one embodiment, the analysis device 122 locates a waveform of interest 406 of the clearance signal 400 that is located at or near one or more frequency components of interest 408. For example, the center of the waveform of interest 406 may be located at the frequency components of interest 408. As another example, a peak or the center of the waveform of interest 406 may be at a frequency that is larger or smaller than the frequency components of interest 408, but a width dimension 410 of the waveform of interest 406 may be sufficiently large that the frequency of interest 408 is within the width dimension 410.

The frequency components of interest 408 can be based on the speed at which the moving component 106 of the machine 108 is rotating. For example, the frequency components of interest 408 may be a designated fraction or percentage of the frequency at which the moving component 106 is rotating. This designated fraction or percentage may vary based on the type of machine 108, operating conditions of the machine 108, or the like. In one embodiment, the frequency components of interest 408 are within 0.3 to 0.4 of the frequency at which the moving component 106 is rotating. Optionally, other values may be used. In another embodiment, the frequency components of interest 408 include a range of frequencies, such as those frequencies from 0.3 to 0.4 of the frequency at which the moving component 106 is rotating. Optionally, another range of frequencies may be used.

Once the waveform of interest 406 is identified by the analysis device 122, the analysis device 122 can calculate the spectral energy of the frequency components of interest 408 of the rotating machine 108. In one embodiment, the spectral energy can be calculated as the area encompassed by the waveform of interest 406 in the imbalance signal 400. Because the waveform of interest 406 may significantly change shape, but not necessarily size, when the rotating speed of the machine 108 changes, the area encompassed by the waveform of interest 406 may be a more reliable indicator of imbalance in the machine 108.

In one embodiment, the spectral energy that is calculated may be compared to one or more designated energy thresholds by the analysis device 122. The energy thresholds may be stored in a memory device 124 (shown in FIG. 1), such as a computer hard drive, flash drive, optical disc, or the like. Alternatively, the energy thresholds may be communicated to the analysis device 122 from another location. One or more different energy thresholds may be representative of different amounts of imbalance in the machine 108. The analysis device 122 can compare the calculated spectral energy and compare this spectral energy to the thresholds. If the calculated spectral energy exceeds one or more thresholds and based on which thresholds are exceeded by the spectral energy, the analysis device 122 may determine or estimate an amount of imbalance in the machine 108. For example, if the spectral energy only exceeds a relatively low threshold, then the analysis device 122 may determine that the imbalance in the machine is relatively low. But, if the spectral energy exceeds a larger threshold, then the analysis device 122 may determine that the imbalance is more significant.

Figure 5:
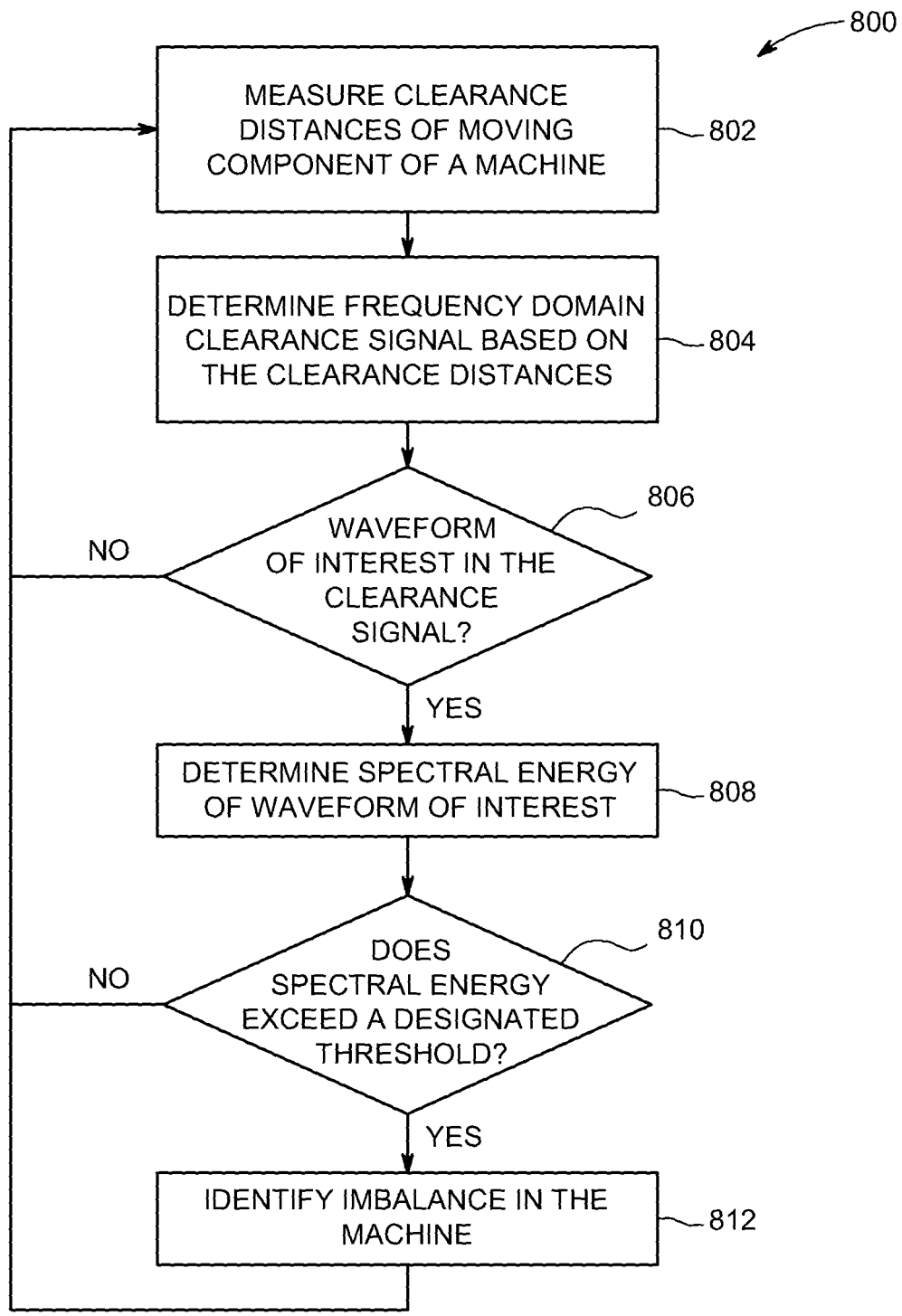
FIG. 5 illustrates a flowchart of a method for monitoring a machine, such as to identify imbalance in the machine, according to one embodiment.

FIG. 5 illustrates a flowchart of a method 800 for monitoring a machine, such as to identify imbalance in the machine, according to one embodiment. The method 800 may be performed by one or more embodiments of the system 100 described herein, or with another system. At 802, clearance distances of a moving component of a machine are measured. For example, the distances between a sensor and a rotating component of a machine may be monitored over time.

At 804, a frequency domain clearance signal of the machine is determined. For example, a frequency domain clearance signal may be created based on the clearance distances of the machine. At 806, a determination is made as to whether a waveform of interest appears in the clearance signal. For example, the frequency components of interest in the clearance signal can be examined to determine if the clearance signal exceeds one or more thresholds in these frequency components of interest. The frequency components of interest can be based on the speed at which the moving component of the machine is rotating. For example, the frequency components of interest may be a designated fraction or percentage of the frequency at which the moving component is rotating. In one embodiment, the frequency components of interest are within 0.3 to 0.4 of the frequency at which the moving component is rotating. Optionally, other values may be used. A waveform of interest may be identified in the clearance signal responsive to the clearance signal exceeding the one or more thresholds in the frequency components of interest.

If a waveform of interest is identified, then the clearance signal may indicate imbalance in the machine. As a result, flow of the method 800 can proceed to 808. On the other hand, if a waveform of interest is not identified, then the clearance signal may not indicate imbalance in the machine. As a result, flow of the method 800 can return to 802.

At 808, spectral energy of the waveform of interest can be determined. This spectral energy may be determined by calculating or measuring the area in the clearance signal that is encompassed by the waveform of interest. Optionally, the spectral energy can be determined in another manner.

At 810, the spectral energy of the waveform of interest is examined to determine if the spectral energy indicates imbalance in the machine. For example, if the spectral energy is sufficiently large (e.g., exceeds one or more designated thresholds), then the spectral energy may indicate imbalance in the machine. As a result, flow of the method 800 can proceed to 812. On the other hand, if the spectral energy is sufficiently small (e.g., does not exceed one or more thresholds), then the spectral energy may not indicate imbalance in the machine. As a result, flow of the method 800 can return to 802.

At 812, imbalance in the machine is identified based on the spectral energy. As described above, responsive to identification of the imbalance, an operator of the machine or a system that includes the machine may be notified of the imbalance, the operating speed of the machine may be automatically reduced or stopped, the operator may be instructed to reduce or stop the operating speed of the machine, one or more communication signals may be sent to an off-board location to notify the off-board location of the imbalance (e.g., to order repair, inspection, or replacement of the machine), or the like. Flow of the method 800 may return to 802 for continued monitoring of the machine, or may terminate.

Returning to the description of the system 100 shown in FIG. 1, additionally or alternatively, the clearance distances of the machine 108 can be examined in order to identify fluid instability and/or wear in the machine 108, and/or to predict an RUL of the machine 108. For example, changes in the clearance distances at different rotating speeds of the machine may be used to identify a trigger speed of the machine. The trigger speed can represent the speed of the machine at which instability (e.g., fluid instability) is detected. The onset of this instability can be detected by examining sub-synchronous frequency components of a demodulated clearance signal of the machine, such as in the 0.3× to 0.4× frequency range of the clearance signal (or another range), as described below.

Figure 6:
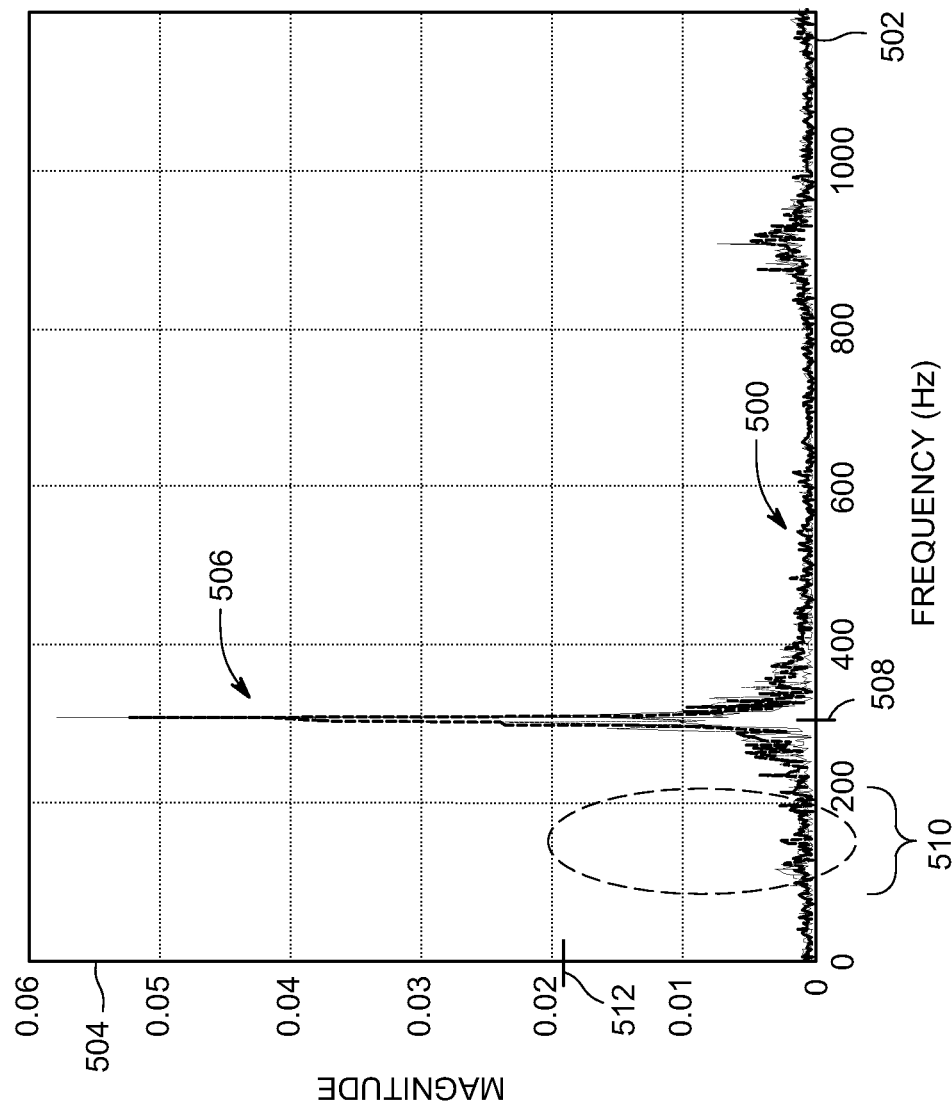
FIG. 6 illustrates a frequency spectrum of the clearance signal to measure imbalance of the machine shown in FIG. 1 according to one example.
Figure 7:
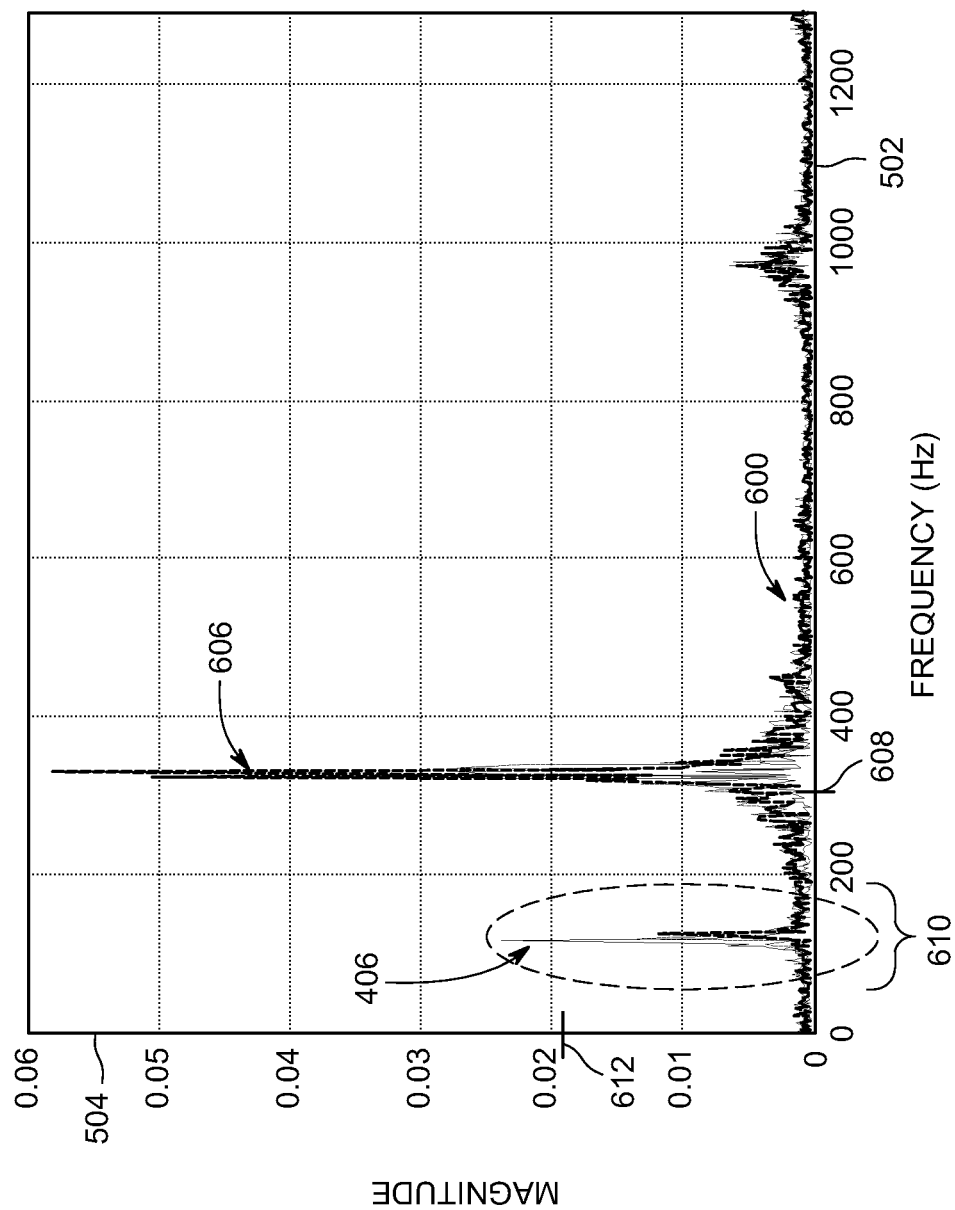
FIG. 7 illustrates another frequency spectrum of the clearance signal to measure imbalance of the machine shown in FIG. 1 according to one example.
Figure 8:
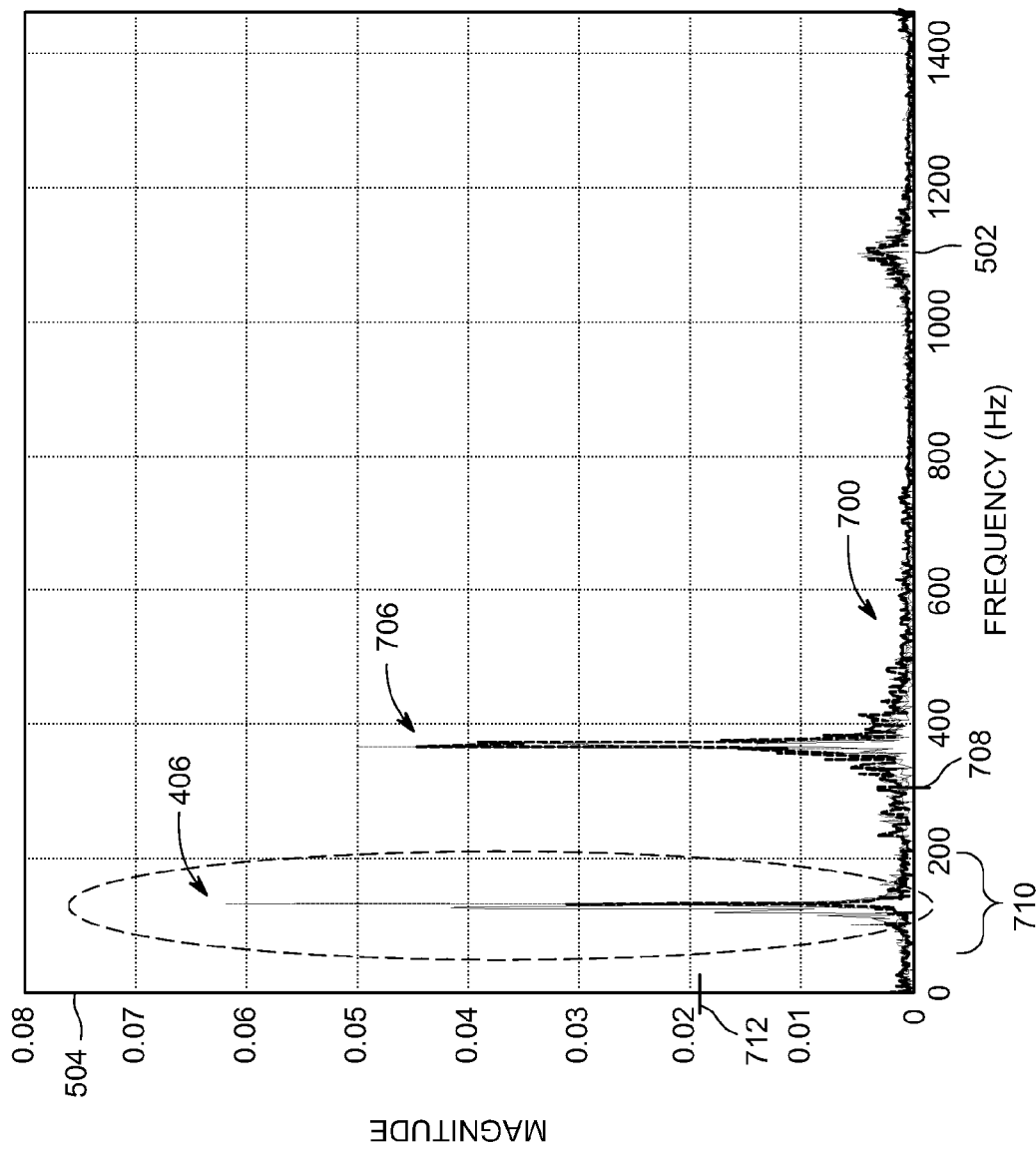
FIG. 8 illustrates a frequency spectrum of the clearance signal to measure imbalance of the machine shown in FIG. 1 according to one example.

FIGS. 6 through 8 illustrate frequency domain demodulated clearance signals 500, 600, 700 of the machine 108 that are based on clearance distances 104 measured at different rotating speeds of the machine 108 according to one example. The clearance signals 500, 600, 700 are shown alongside horizontal axes 502 representative of frequency and vertical axes 504 representative of magnitudes of the clearance signals 500, 600, 700. In one example, the clearance signal 500 may be determined from the clearance distances 104 measured when the machine 108 was rotating at a first rotating speed, the clearance signal 600 may be determined from the clearance distances 104 measured when the machine 108 was rotating at a faster, second rotating speed, and the clearance signal 700 may be determined from the clearance distances 104 measured when the machine 108 was rotating at a faster, third rotating speed.

The analysis device 122 may generate and/or measure the clearance signals 500, 600, 700 at different times of operation of the machine 108, and store the clearance signals 500, 600, 700 and/or measurements of the clearance signals 500, 600, 700 in the memory device 124 or another location. A harmonic or primary peak 506, 606, 706 may occur in the clearance signals 500, 600, 700 at or near a harmonic or primary frequency 508, 608, 708 that is representative of the rotating speed of the machine 108. In the illustrated example, the harmonic peak 506 occurs at a frequency of 300 hertz, indicating that the clearance signal 500 is based on clearance distances 104 measured when the machine 108 was rotating at a speed of approximately 18,000 revolutions per minute (rpm). The harmonic peak 606 occurs at a frequency of 333 hertz, indicating that the clearance signal 600 is based on clearance distances 104 measured when the machine 108 was rotating at a speed of approximately 20,000 rpm. The harmonic peak 706 occurs at a frequency of 366 hertz, indicating that the clearance signal 700 is based on clearance distances 104 measured when the machine 108 was rotating at a speed of approximately 22,000 rpm.

The analysis device 122 can examine sub-harmonic portions of the clearance signals 500, 600, 700 in order to identify the presence or absence of one or more waveforms of interest 406. For example, the analysis device 122 can determine the harmonic frequencies 508, 608, 708 in the clearance signals 500, 600, 700 based on the rotating speed of the machine 108. The analysis device 122 can examine the portions of the clearance signals 500, 600, 700 associated with frequencies that are less than the harmonic frequencies 508, 608, 708. These frequencies can be referred to as sub-harmonic frequencies. In one embodiment, the analysis device 122 examines all or substantially all of the sub-harmonic frequencies to determine if one or more waveforms of interest 406 are present. Optionally, the analysis device 122 may examine a subset of the sub-harmonic frequencies, such as by examining a smaller range of the sub-harmonic frequencies. By way of example only, the analysis device 122 can examine the portion of the clearance signal 500, 600, 700 that is within 0.3 to 0.4 of the harmonic frequency 508, 608, 708 (e.g., in the range of 0.3× to 0.4×). Optionally, the analysis device 122 can examine a larger or smaller portion of the clearance signal 500, 600, 700 that is within the sub-harmonic frequencies.

The portion of the clearance signal 500, 600, 700 that is examined by the analysis device 122 for the waveform of interest 406 can be referred to as a sub-harmonic range of interest 510, 610, 710. The analysis device 122 can examine the clearance signal 500, 600, 700 within this range 510, 610, 710 to identify the waveform of interest 406 by determining if the clearance signal 500, 600, 700 exceeds a designated identification threshold 512, 612, 712. The identification threshold 512, 612, 712 may be based on the amplitude of the clearance signal 500, 600, 700 at the primary or harmonic frequency 508, 608, 708. For example, the identification threshold 512, 612, 712 may be a designated fraction or percentage of the amplitude of the clearance signal 500, 600, 700 at the primary or harmonic frequency 508, 608, 708. Optionally, the identification threshold 512, 612, 712 may be a designated value that is not based on the amplitude of the clearance signal 500, 600, 700 at or near the primary or harmonic frequency 508, 608, 708.

If the clearance signal 500, 600, 700 exceeds this identification threshold 512, 612, 712 in the sub-harmonic range of frequencies, then the analysis device 122 can determine that the waveform of interest 406 is present. This waveform of interest 406 can be representative of imbalance in the machine 108, as described above.

In the illustrated example, no waveform of interest is identified in the clearance signal 500. But, the analysis device 122 may identify waveforms of interest 406 in the clearance signals 600, 700, as shown in FIGS. 7 and 8. As described above, in one aspect, the analysis device 122 can measure the areas encompassed by these waveforms of interest 406 (e.g., the area bounded by the horizontal axis 502 or other baseline value of the clearance signal, the rising edge of the waveform of interest 406, and the falling edge of the waveform of interest 406). These areas can represent a spectral energy of the machine 108 at the different operating speeds associated with the clearance signals 600, 700, and can be used to identify imbalance in the machine 108, as described above.

With respect to the monitoring of wear in the machine 108, however, the analysis device 122 can monitor the clearance signals of the machine 108 at different operating speeds of the machine 108 to identify a trigger speed of the machine 108. This trigger speed can represent the rotational speed of the moving component 106 at which fluid instability in the machine 108 initiates. This onset of fluid instability can be identified by determining the speed of the machine 108 at which a sub-synchronous frequency component of the clearance signals increases above one or more thresholds. For example, the analysis device 122 can examine clearance signals of the machine 108 over time, with the clearance signals obtained at different rotational speeds of the machine 108. The analysis device 122 may identify a speed at which a peak in the sub-harmonic or sub-synchronous range of the clearance signal increases above a threshold.

The analysis device 122 can examine the clearance signals at different speeds to identify the onset of fluid instability in the machine 108, which can be indicative of wear (e.g., bearing wear) in the machine 108. For example, during a first period of time, the machine 108 may operate at the speeds of 18,000 rpm, 20,000 rpm, 22,000 rpm, or the like. The clearance signals for these different speeds may be examined by the analysis device 122 to identify the presence and/or absence of the waveforms of interest 406 in the sub-harmonic frequencies of the clearance signals. In the example of FIGS. 6, 7, and 8, the waveforms of interest 406 appear in the clearance signals associated with the higher operating speeds (e.g., 20,000 rpm and 22,000 rpm), but not in the clearance signal associated with the lower operating speed. The analysis device 122 may record the presence and/or absence of the waveforms of interest 406 at the various operating speeds in the memory device 124 or elsewhere.

During a different, second period of time (e.g., several minutes, hours, days, weeks, months, or the like, later), the machine 108 may again operate at the same or slightly different speeds (e.g., one or more of the same speeds of 18,000 rpm, 20,000 rpm, 22,000 rpm, or within a designated range of 1%, 5%, 10%, etc., of these speeds) at which the previous clearance signals were examined. The clearance signals for these speeds may be examined by the analysis device 122 to identify the presence and/or absence of the waveforms of interest 406 in the sub-harmonic frequencies of the clearance signals. Changes in the presence and/or absence of the waveforms of interest 406 at one or more of the different operating speeds of the machine 108 at the different times may be indicative of increasing wear in the machine 108.

For example, if the waveform of interest 406 does not appear at an operating speed (e.g., 18,000 rpm) during a first period of time, but does appear at this same or slightly different operating speed during a subsequent, second period of time, then the analysis device 122 may determine that fluid instability in the machine 108 is beginning or occurring. This onset of fluid instability can be indicative of wear.

The identification of the instability at lower and lower operating speeds of the machine 108 can be indicative of increasing wear of the machine 108. For example, as bearings of a turbocharger wear, clearance opens up and the sub-harmonic response of the rotor (e.g., the appearance of the waveform of interest 406) appears at lower and lower rpms of the rotor. Therefore, as the waveform of interest appears at lower and lower operating speeds of the machine 108, the analysis device 122 may identify more and more wear to the machine 108 (e.g., to bearings or other components of the machine 108).

Changes in the trigger speed at which this sub-synchronous peak is identified can be used by the analysis device 122 to predict or estimate an RUL of the machine 108. For example, the memory device 124 may store several different trigger speeds with associated remaining operating time periods of the machine 108. Faster trigger speeds may be associated with longer operating time periods and slower trigger speeds may be associated with shorter operating time periods. Based on which stored trigger speed matches the actual trigger speed determined by the analysis device 122 or is closer to the actual trigger speed than one or more other stored trigger speeds, the analysis device 122 may determine the associated remaining operating time. This remaining operating time can be used as the RUL of the machine 108. For example, this time can indicate how much longer the machine 108 may be able to operate before failure of the machine 108 or repair of the machine 108 is needed to avoid failure.

As described herein, imbalance in the machine 108 and/or the onset of fluid instability (e.g., wear) in the machine 108 may be identified based on changes in the clearance distance. Responsive to imbalance and/or wear being detected, the analysis system 122 can direct an output device 126 to take one or more remedial actions. With respect to the identification of imbalance in the machine 108, the analysis system 122 can compare the spectral energy that is calculated from one or more clearance signals to one or more energy thresholds, with different energy thresholds representative of different degrees or amounts of imbalance in the machine 108. Based on which of these energy thresholds are exceeded and/or which thresholds are not exceeded by the calculated spectral energy, the analysis system 122 can direct the output device 126 to inform an operator of the machine 108 of the amount of imbalance; recommend or automatically change operation of the machine 108 (e.g., such as by slowing an operating speed of the machine 108); communicate a signal to another location to request or recommend inspection, repair, or replacement of the machine 108 or one or more components of the machine 108; or the like. With respect to the identification of the onset of fluid instability and/or wear in the machine 108, the analysis system 122 can compare the trigger speed to one or more different speed thresholds. Different speed thresholds may be associated with different amounts of wear and/or different RULs of the machine 108. For example, slower speed thresholds may be indicative of increased wear and/or shorter RULs, while faster speed thresholds may be indicative of lesser wear and/or longer RULs. Based on which of these speed thresholds that the trigger speed exceeds or does not exceed, the amount of wear and/or RUL of the machine 108 can be estimated. For example, if the trigger speed is faster than a lower speed threshold but slower than an upper speed threshold, then the wear and/or RUL associated with the lower speed threshold can be estimated for the machine 108. Optionally, the wear and/or RUL of the upper speed threshold can be estimated. The estimated wear and/or RUL can be reported to the operator of the machine 108, and/or used by the analysis system 122 to recommend or automatically change operation of the machine 108 (e.g., such as by slowing an operating speed of the machine 108); communicate a signal to another location to request or recommend inspection, repair, or replacement of the machine 108 or one or more components of the machine 108; or the like.

The output device 126 includes hardware circuits or circuitry that includes and/or are connected with one or more computer processors (e.g., computer microprocessors). The output device 126 can communicate information (e.g., warnings, alerts, or the like) representative of the imbalance and/or wear of the machine 108 that is detected by the analysis device 122, such as by displaying information on a display device, audibly presenting the information through one or more speakers, or the like. Optionally, the output device 126 can generate signals that control operation of the machine 108 (e.g., to slow down operation of the machine 108), that are communicated to another location (e.g., to request or schedule inspection, repair, or replacement of the machine 108 and/or component 106 of the machine 108), or the like.

Figure 9:
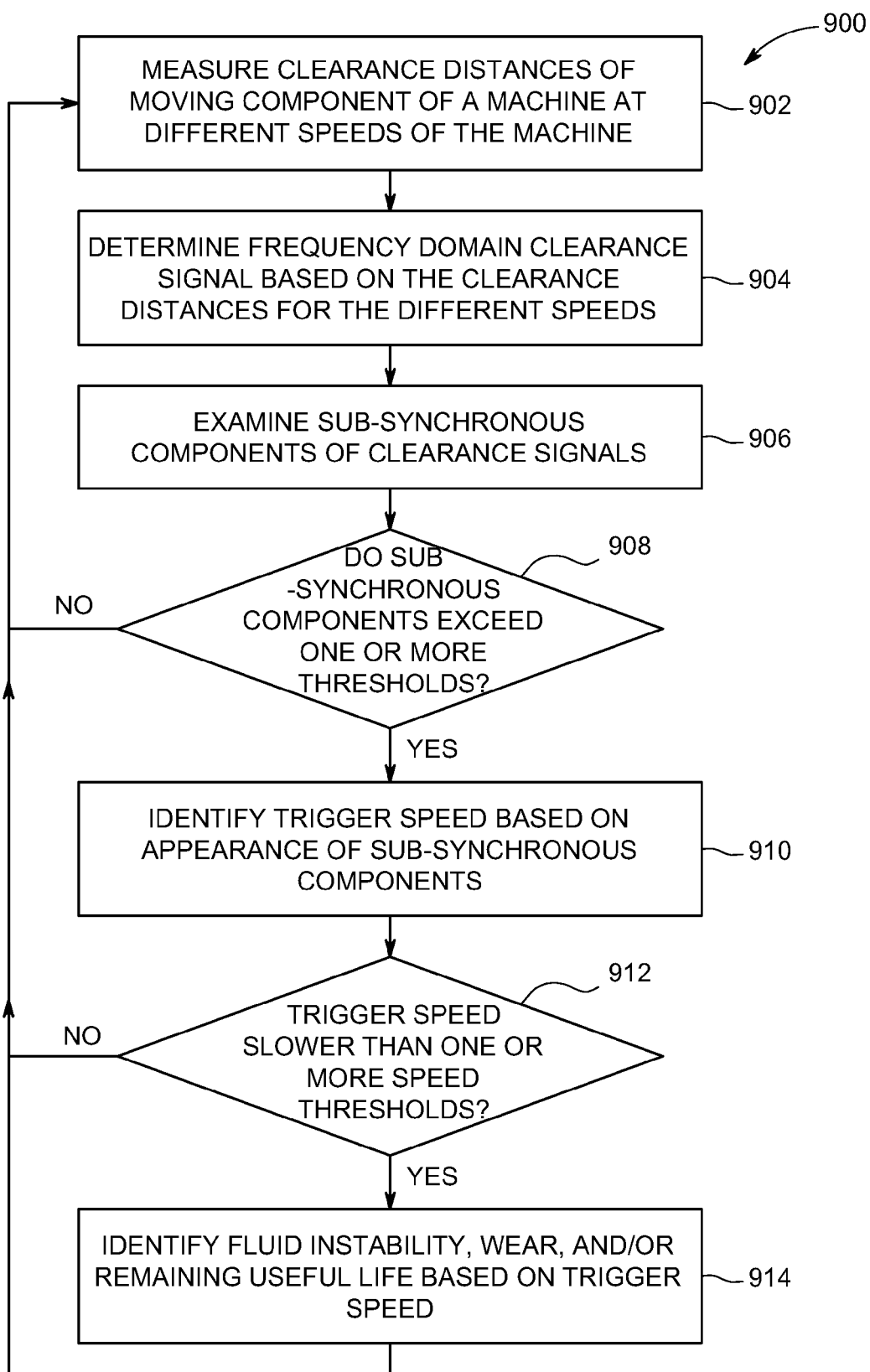
FIG. 9 illustrates a flowchart of a method for monitoring a machine, such as to identify fluid instability and/or wear of the machine, according to one embodiment.

FIG. 9 illustrates a flowchart of a method 900 for monitoring a machine, such as to identify fluid instability in the machine, to identify wear of the machine, and/or to determine an RUL of the machine, according to one embodiment. The method 900 may be performed by one or more embodiments of the system 100 described herein, or with another system. At 902, clearance distances of a moving component of a machine are measured. For example, the distances between a sensor and a rotating component of a machine may be monitored over time. The clearance distances can be measured at different operating (e.g., rotational) speeds of the machine.

At 904, frequency domain clearance signals of the machine are determined. For example, different frequency domain clearance signals may be created based on the clearance distances of the machine. Different clearance signals may be created from the clearance distances associated with different speeds of the machine.

At 906, sub-synchronous components of the clearance signals are examined. For example, the magnitudes of one or more frequency components of interest that occur at frequencies that are less than the harmonic or primary frequencies of the clearance signals can be examined. In one embodiment, the frequency components of the clearance signals that are within 0.3× to 0.4× of the harmonic or primary frequency are examined.

At 908, a determination is made as to whether the frequency components of interest in one or more of the clearance signals exceed one or more thresholds. As described above, a clearance signal that exceeds one or more designated thresholds within sub-synchronous frequency components of the clearance signal may indicate a trigger speed of the machine. If the frequency components of interest in one or more of the clearance signals exceeds one or more designated, non-zero thresholds, then flow of the method 900 can continue to 910. Otherwise, flow of the method 900 may return to 902.

At 910, the speed of the machine at which the sub-synchronous frequency components of interest in the clearance signal exceed the one or more designated thresholds is identified as the trigger speed of the machine. For example, the slowest speed at which the frequency components of interest in the sub-synchronous range of the clearance signals exceed the one or more thresholds (or the speed that is slower than one or more, but not all, of the speeds) is identified as the trigger speed of the machine.

At 912, the trigger speed is compared to one or more designated speed thresholds. If the trigger speed is slower than one or more, or all, of the designated speed thresholds, then the trigger speed may be indicative of fluid instability in the machine, wear of one or more components of the machine (e.g., bearings), and/or an RUL of the machine. For example, the different speed thresholds may be associated with different fluid instabilities, wears, and/or RULs. Based on which of these speed thresholds that the trigger speed is slower than, the fluid instability, wear, and/or RUL of the machine may be determined, as described above.

If the trigger speed is slower than one or more (or all) of the thresholds, then flow of the method 900 may proceed toward 914. On the other hand, flow of the method 900 may return to 902.

At 914, the fluid instability, wear, and/or RUL of the machine that is associated with one or more speed thresholds that the trigger speed is slower than or that the trigger speed exceeds are identified. For example, if the trigger speed is faster than a lower speed threshold but slower than an upper speed threshold, then the wear and/or RUL associated with the lower speed threshold can be estimated for the machine. Optionally, the wear and/or RUL of the upper speed threshold can be estimated for the machine.

Additionally or alternatively, the trigger speed may be determined at several different times, and changes in the trigger speed may be used to identify instability, wear, and/or an RUL of the machine. Decreases or slowing trends in the trigger speed of a machine can indicate that the fluid instability is initiating at slower and slower speeds, which can mean that the wear of the machine is increasing and/or the RUL of the machine is decreasing.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
   measuring clearance distances with a sensor;
   measuring a rotating speed of a rotating component of a machine with the sensor;
   monitoring changes in the measured clearance distances between the sensor and the rotating component of a machine;
   determining a trigger speed of the machine that is associated with the wear in the machine, the trigger speed determined based on the changes in the clearance distances;
   identifying one or more of imbalance or wear in the machine based on the changes in the clearance distances; and
   estimating a remaining useful life of the machine based on changes in the trigger speed.

2. The method of claim 1, further comprising calculating a spectral energy of the machine based on the changes in the clearance distances, wherein the imbalance in the machine is identified based on the spectral energy.

3. The method of claim 1, further comprising generating an imbalance signal representative of the changes in the clearance distances in a frequency domain, wherein the imbalance is identified based on the imbalance signal.

4. The method of claim 1, further comprising:
   examining frequency domain signals representative of the changes in the clearance distances between the sensor and the rotating component of the machine at different rotating speeds of the rotating component; and
   determining the trigger speed of the machine based on at least one of an absence or a presence of a waveform of interest in sub-harmonic ranges of the frequency domain signals at one or more of the different rotating speeds.

5. A method comprising:
measuring clearance distances with a sensor;
measuring a rotating speed of a rotating component of a machine with the sensor;
monitoring changes in the measured clearance distances between the sensor and the rotating component of the machine;
determining a trigger speed of the machine that is associated with the wear in the machine, the trigger speed determined based on the changes in the clearance distances;
identifying one or more of imbalance or wear in the machine based on the changes in the clearance distances;
examining frequency domain signals representative of the changes in the clearance distances between the sensor and the rotating component of the machine at different rotating speeds of the rotating component; and
determining the trigger speed of the machine based on at least one of an absence or a presence of a waveform of interest in sub-harmonic ranges of the frequency domain signals at one or more of the different rotating speeds.

6. A system comprising:
an acquisition device configured to obtain clearance distances with a sensor that also measures a rotating speed of a rotating component of a machine; and
an analysis device configured to monitor changes in the obtained clearance distances between the sensor and the rotating component of the machine, wherein the analysis device is also configured to identify one or more of imbalance or wear in the machine based on the changes in the clearance distances, wherein the analysis device also is configured to determine a trigger speed associated with the wear in the machine based on the changes in the clearance distances, the trigger speed based on the changes in the clearance distances, wherein the analysis device is also configured to estimate a remaining useful life of the machine based on changes in the trigger speed.

7. The system of claim 6, wherein the analysis device also is configured to calculate a spectral energy of the machine based on the changes in the clearance distance, wherein the analysis device is configured to identify the imbalance in the machine based on the spectral energy.

8. The system of claim 6, wherein the analysis device is configured to generate an imbalance signal representative of the changes in the clearance distances in a frequency domain, and to identify the imbalance based on the imbalance signal.

9. The system of claim 6, wherein the analysis device also is configured to examine frequency domain signals representative of the changes in the clearance distances between the sensor and the rotating component of the machine at different rotating speeds of the rotating component, wherein the analysis device is configured to determine the trigger speed of the machine based on at least one of an absence or a presence of a waveform of interest in sub-harmonic ranges of the frequency domain signals at one or more of the different rotating speeds.

10. A system comprising:
an acquisition device configured to obtain clearance distances with a sensor that also measures a rotating speed of a rotating component of a machine; and
an analysis device configured to monitor changes in the obtained clearance distances between the sensor and the rotating component of the machine, wherein the analysis device is also configured to identify one or more of imbalance or wear in the machine based on the changes in the clearance distances, wherein the analysis device also is configured to determine a trigger speed associated with the wear in the machine based on the changes in the clearance distances, the trigger speed based on the changes in the clearance distances, wherein the analysis device also is configured to examine frequency domain signals representative of the changes in the clearance distances between the sensor and the rotating component of the machine at different rotating speeds of the rotating component, wherein the analysis device is configured to determine the trigger speed of the machine based on at least one of an absence or a presence of a waveform of interest in sub-harmonic ranges of the frequency domain signals at one or more of the different rotating speeds.

* * * * *